(12) United States Patent
Swab et al.

(10) Patent No.: US 8,276,611 B2
(45) Date of Patent: Oct. 2, 2012

(54) EXTERNALLY ADJUSTABLE PRESSURE COMPENSATED FLOW CONTROL VALVE

(75) Inventors: John H. Swab, Simpsonville, SC (US); Matthew C. Dunlap, Taylor, MI (US); Thomas M. Suggs, Southgate, MI (US); Donald E. Weber, Livonia, MI (US)

(73) Assignee: BASF Corporation, Florham Park, NJ (US)

( * ) Notice: Subject to any disclaimer, the term of this patent is extended or adjusted under 35 U.S.C. 154(b) by 698 days.

(21) Appl. No.: 12/210,037

(22) Filed: Sep. 12, 2008

(65) Prior Publication Data
US 2010/0065768 A1 Mar. 18, 2010

(51) Int. Cl.
*F16K 31/122* (2006.01)
(52) U.S. Cl. ........ 137/501; 137/497; 137/498; 239/571; 239/583
(58) Field of Classification Search ............... 137/208, 137/206, 209, 15.19, 494, 497, 500–504, 137/498; 239/570, 571, 583
See application file for complete search history.

(56) References Cited

U.S. PATENT DOCUMENTS

| | | | |
|---|---|---|---|
| 334,011 A | 1/1886 | Franklin | |
| 2,411,392 A * | 11/1946 | Saville | 137/498 |
| 2,504,117 A | 4/1950 | Downs | |
| 2,872,939 A * | 2/1959 | Terry | 137/504 |
| 3,741,242 A * | 6/1973 | Hansen et al. | 137/504 |
| 3,795,364 A | 3/1974 | Kattner | |
| 3,882,052 A | 5/1975 | Raynor et al. | |
| 4,138,454 A | 2/1979 | Harmon et al. | |
| 4,234,007 A | 11/1980 | Titone et al. | |
| 4,383,552 A * | 5/1983 | Baker | 138/46 |
| 4,913,317 A | 4/1990 | Wernicke | |
| 5,004,125 A | 4/1991 | Standlick | |
| 5,086,949 A | 2/1992 | Vulpitta et al. | |
| 5,104,006 A | 4/1992 | Brown | |
| 5,180,082 A | 1/1993 | Cherfane | |
| 5,246,143 A | 9/1993 | Cherfane | |
| 5,318,637 A | 6/1994 | Wernicke | |
| 5,360,831 A | 11/1994 | Lidy et al. | |

(Continued)

FOREIGN PATENT DOCUMENTS

DE 2806102 A1 2/1978

(Continued)

OTHER PUBLICATIONS

English language abstract for FR 2535435 extracted from espacenet.com database, dated Mar. 24, 2011, 1 page.

(Continued)

*Primary Examiner* — Craig Schneider
(74) *Attorney, Agent, or Firm* — Howard & Howard Attorneys PLLC

(57) ABSTRACT

An in-line fluid flow control valve includes a housing defining an inlet chamber and an outlet chamber aligned along a outlet axis. The housing further defines a bore with a flow control device and an adjustment mechanism disposed therein for regulating a fluid flow rate. The flow control device defines a fluid passage interconnecting the inlet chamber and the outlet chamber. The plane and the outlet axis define an acute angle therebetween. The angled position of the bore relative to the outlet axis permits access to and adjustment of the flow control device, as well as replacement of the flow control device, without disconnecting any fittings attached to the inlet and the outlet of the control valve.

30 Claims, 4 Drawing Sheets

U.S. PATENT DOCUMENTS

| | | |
|---|---|---|
| 5,388,764 A | 2/1995 | Moses |
| 5,403,088 A | 4/1995 | Killmer et al. |
| 5,411,321 A | 5/1995 | Harness |
| 5,878,766 A | 3/1999 | Dekhtyar |
| 5,950,875 A | 9/1999 | Lee et al. |
| 6,534,556 B2 | 3/2003 | Lacarte et al. |
| 6,688,319 B2 | 2/2004 | Trantham et al. |
| 6,797,736 B1 | 9/2004 | Smiecinski et al. |
| 7,156,120 B2 | 1/2007 | Cherfane et al. |
| 7,350,672 B1 | 4/2008 | Gerich |
| 7,377,404 B2 | 5/2008 | Cherfane |
| 7,717,059 B2 | 5/2010 | Wanthal et al. |
| 7,954,673 B2 | 6/2011 | Kosmyna et al. |
| 2003/0150872 A1 | 8/2003 | Huber et al. |
| 2004/0124268 A1 | 7/2004 | Frazier et al. |
| 2005/0103889 A1 | 5/2005 | Langeman |
| 2006/0076064 A1 | 4/2006 | Carter et al. |
| 2007/0170282 A1 | 7/2007 | MeMichael |
| 2010/0065130 A1 | 3/2010 | Swab et al. |
| 2010/0069517 A1 | 3/2010 | Swab et al. |
| 2011/0121034 A1 | 5/2011 | Swab et al. |

FOREIGN PATENT DOCUMENTS

| | | |
|---|---|---|
| DE | 2934825 A1 | 8/1979 |
| EP | 1353254 A2 | 10/2003 |
| EP | 1712821 A1 | 10/2006 |
| FR | 2535435 A1 | 5/1984 |

OTHER PUBLICATIONS

The Dow Chemical Company, "Dow Polyurethane Systems Products"; The Dow Chemical Company website; www.dow.com/pusystems/product/deltagun.htm, accessed Jan. 28, 2008.

BASF Corporation, "BASF Polyurethanes—Building and Construction"; The BASF Corporation website; www.basf.com/urethanechemicals,Specialty_Systems/equipment_bc.html, accessed Jan. 28, 2008.

U.S. Appl. No. 12/951,741, filed Nov. 22, 2010, "Foam Dispensing Apparatus", 35 pages.

English translation of DE 2934825, extracted from espacenet.com, 17 pages.

English translation of DE 2806102 A1, extracted from espacenet.com, 22 pages.

PCT International Search Report PCT/EP2010/067929, dated Mar. 17, 2011, 6 pages.

\* cited by examiner

EXTERNALLY ADJUSTABLE PRESSURE COMPENSATED FLOW CONTROL VALVE

BACKGROUND OF THE INVENTION

1. Field of the Invention

The subject invention relates to a fluid flow control valve, and more specifically to an adjustable in-line fluid flow control valve for controlling a flow rate of a fluid therethrough.

2. Description of the Prior Art

In existing manufacturing systems, an important element is the regulation of a flow of a material, such as a fluid, therethrough. Inline fluid flow control valves are adjustable to permit operators to effectively regulate the fluid flow through the existing manufacturing system. Adjusting a flow control device within the control valve adjusts a fluid flow rate through the control valve.

The fluid flow rate is important for regulating a mixing ratio in the manufacturing systems utilizing multiple fluids. A resultant mix ratio is generated based upon the adjusted fluid flow rate for each of the multiple fluids. When a new mix ratio is required, typical inline control valves require significant modifications. Typical inline control valves require removal of the control valve from a pipeline of the manufacturing system to adjust the flow control device within the control valve. As the control valve is inline, the pipeline connecting the control valve is disabled and the control valve is fully disconnected from the pipeline. The control valve is then manually adjusted and then reconnected into the pipeline. In one common technique, a fixed flow rate valve includes an internal set screw, wherein the internal set screw allows for the increase or decrease of a flow rate, within a pre-determined flow range of the control valve. The pre-determined flow range of the control valve is determined by the flow control device.

Upon reconnection, the pipeline is enabled and then the fluid flow rate through the control valve is measured. If the fluid flow rate is incorrect, the process must be repeated until correct. Therefore, the pipeline is disabled, the control valve removed, adjusted, reconnected and the pipeline re-enabled until the fluid flow rate is correct.

U.S. Pat. No. 7,156,120 to Cherfane et al. discloses an inline fluid flow control valve. The control valve comprises a housing defining an inlet and an outlet. The outlet is spaced from the inlet along a outlet axis. The housing further defines a fluid passage interconnecting the inlet and the outlet. A flow control device controls a fluid flow rate through the fluid passage. An adjustment mechanism is coupled to the flow control device to adjust the fluid flow rate. The control valve is adjustable without completely disconnecting the control valve from the pipeline. However, the pre-determined range of the fluid flow rate, as controlled by an internal flow control device, is not changeable without disassembling the control valve.

SUMMARY OF THE INVENTION AND ADVANTAGES

The subject invention provides a fluid flow control valve. The control valve comprises a housing. The housing defines an inlet chamber and an outlet chamber. The outlet chamber is disposed along an outlet axis and is spaced from the inlet chamber. A flow control device defines a fluid passage. The fluid passage interconnects the inlet chamber and the outlet chamber. The flow control device controls a fluid flow rate of a fluid between the inlet chamber and the outlet chamber. An adjustment mechanism is coupled to the flow control device. The adjustment mechanism adjusts the fluid flow rate. The housing further defines an opening and a bore extending from the opening along a plane. The plane intersects the outlet axis. The flow control device and the adjustment mechanism are disposed within the bore, with the adjustment mechanism being operable through the opening.

Accordingly, the control valve of the subject invention not only permits adjustment of the flow control device without the need to disconnect the control valve from any connecting pipeline, but also permits access to the flow control device through the opening of the bore. As such, one flow control device having a pre-determined flow range may be swapped with another flow control device having a different pre-determined flow range to change the fluid flow rate of the control valve beyond that permissible by adjustment of the flow control valve, without disconnecting the control valve from the pipeline.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a fluid flow control valve is shown generally at 20. The control valve 20 regulates a fluid flow rate of a fluid through the control valve 20.

Figure 1:
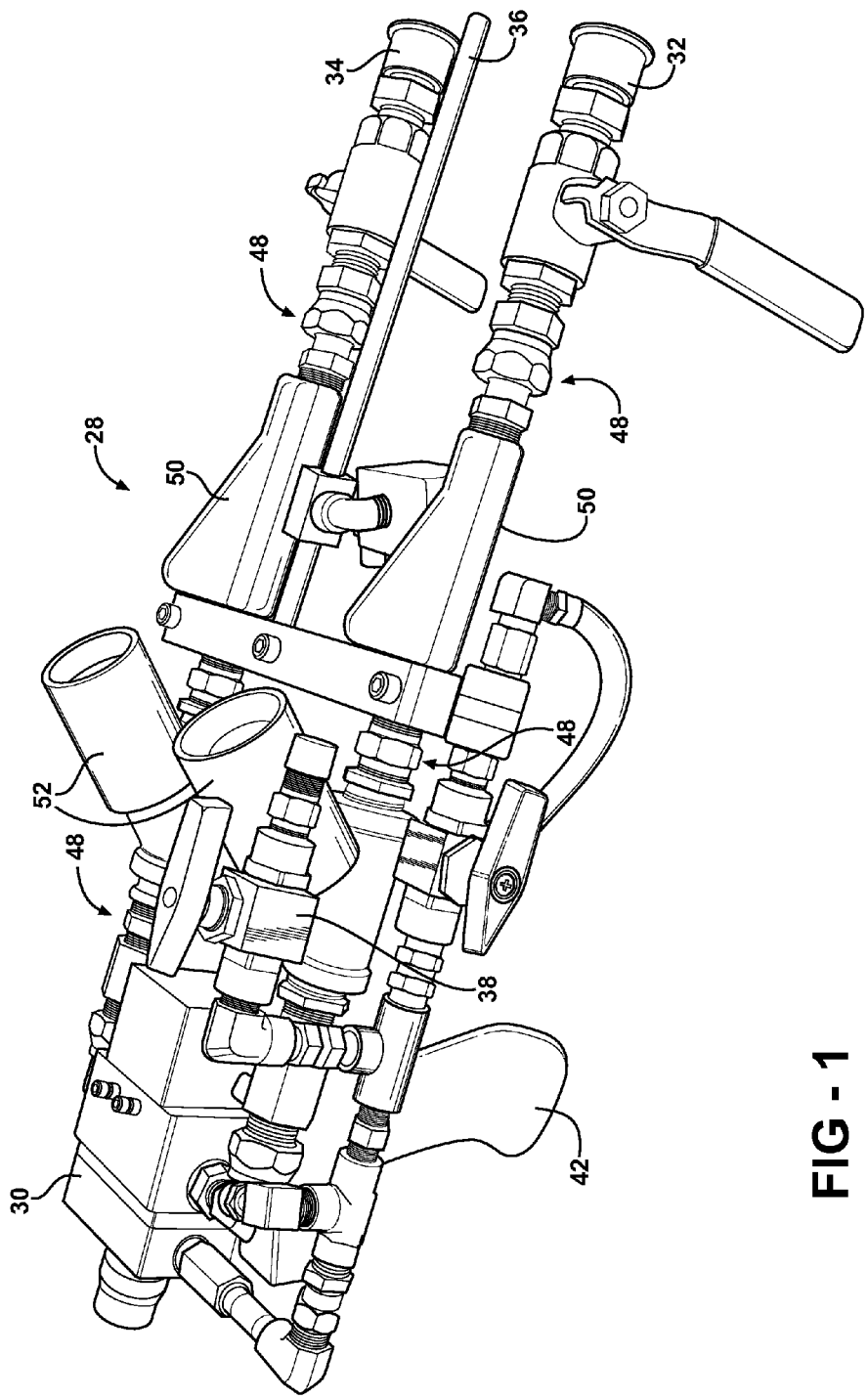
FIG. 1 is a perspective view of a two component foam dispenser.

Referring to FIG. 1, a pair of control valves 20 is shown incorporated into a two-component expandable foam dispensing apparatus 22. The foam dispensing apparatus 22 dispenses a mixture of the first component and the second component, i.e., a first fluid and a second fluid. In the case of a polyurethane foam, the first fluid (first component) includes a resin component, and the second fluid (second component) includes an isocyanate component. It should be appreciated that the resin component and the isocyanate component may include foaming agents, curing agents, catalysts, accelerators, as well as other modifying agents. The resin component and the isocyanate component react together to form the polyurethane foam. It should be appreciated that in other applications, the first fluid and the second fluid may comprise other materials.

The isocyanate component may include, but is not limited to, isocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate, wherein "n" may be a number from 2 to 5, from 2 to 4, or from 3 to 4. It is to be understood that "n" may be an integer or may have intermediate values from 2 to 5. The isocyanate component may include an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula R'(NCO)$_z$ wherein R' is aromatic and z is an integer that corresponds to the valence of R'. Preferably, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethylolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

The isocyanate component may have any % NCO content and any viscosity. The isocyanate component may also react with the polyol and/or chain extender in any amount, as determined by one skilled in the art. Preferably, the isocyanate component and the polyol and/or chain extender are reacted at an isocyanate index from 15 to 900, more preferably from 95 to 130, and alternatively from 105 to 130.

The resin component of the subject invention may include a polyol component. More specifically, the polyol component may include one or more of a polyether polyol, a polyester polyol, and combinations thereof. As is known in the art, polyether polyols are typically formed from a reaction of an initiator and an alkylene oxide. Preferably, the initiator is selected from the group of aliphatic initiators, aromatic initiators, and combinations thereof. In one embodiment, the initiator is selected from the group of ethylene glycol, propylene glycol, dipropylene glycol, butylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), thiodiglycol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, propylene diamine, butylene diamine, hexamethylene diamine, cyclohexalene diamine, phenylene diamine, tolylene diamine, xylylene diamine, 3,3'-dichlorobenzidine, 3,3'-and dinitrobenzidine, alkanol amines including ethanol amine, aminopropyl alcohol, 2,2-dimethyl propanol amine, 3-aminocyclohexyl alcohol, and p-aminobenzyl alcohol, and combinations thereof. It is contemplated that any suitable initiator known in the art may be used in the present invention.

Preferably, the alkylene oxide that reacts with the initiator to form the polyether polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes ethylene oxide. However, it is also contemplated that any suitable alkylene oxide that is known in the art may be used in the present invention.

The polyether polyol may include an ethylene oxide cap of from 5 to 20% by weight based on the total weight of the polyester polyol. It is to be understood that the terminology "cap" refers to a terminal portion of the polyether polyol. Without intending to be bound by any particular theory, it is believed that the ethylene oxide cap promotes an increase in a rate of the reaction of the polyether polyol and the isocyanate.

The polyether polyol may also have a number average molecular weight of from 18 to 10,000 g/mol. Further, the polyether polyol may have a hydroxyl number of from 15 to 6,250 mg KOH/g. The polyether polyol may also have a nominal functionality of from 2 to 8. Further, the polyether polyol may also include an organic functional group selected from the group of a carboxyl group, an amine group, a carbamate group, an amide group, and an epoxy group.

Referring now to the polyester polyols introduced above, the polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Suitable glycols include, but are not limited to, those described above.

The polyester polyol may also have a number average molecular weight of from 80 to 1,500 g/mol. Further, the polyester polyol may have a hydroxyl number of from 40 to 600 mg KOH/g. The polyester polyol may also have a nominal functionality of from 2 to 8. Further, the polyester polyol may also include an organic functional group selected from the group of a carboxyl group, an amine group, a carbamate group, an amide group, and an epoxy group.

In use, the two components of the foam composition are rapidly mixed together. A rapid cross-linking reaction and foam expansion commences, which ultimately yields a low density but relative high load bearing urethane rigid foam. The mixing of the resin component and the isocyanate component must occur at a proper flow rate and mix under rapid and sufficient impingement conditions to obtain an acceptable product. Accordingly, one of the control valves 20 regulates the fluid flow rate of the resin component and the other control valve 20 regulates the fluid flow rate of the isocyanate component. It should be appreciated that the control valve 20 of the subject invention may be incorporated into other production systems requiring the discharge of a fluid at a precise flow rate. Therefore, it should be appreciated that the control valve 20 of the subject invention is not limited to use in the foam dispensing apparatus 22 shown in FIG. 1 and described above, and may be utilized in other types of production systems.

Figure 2:
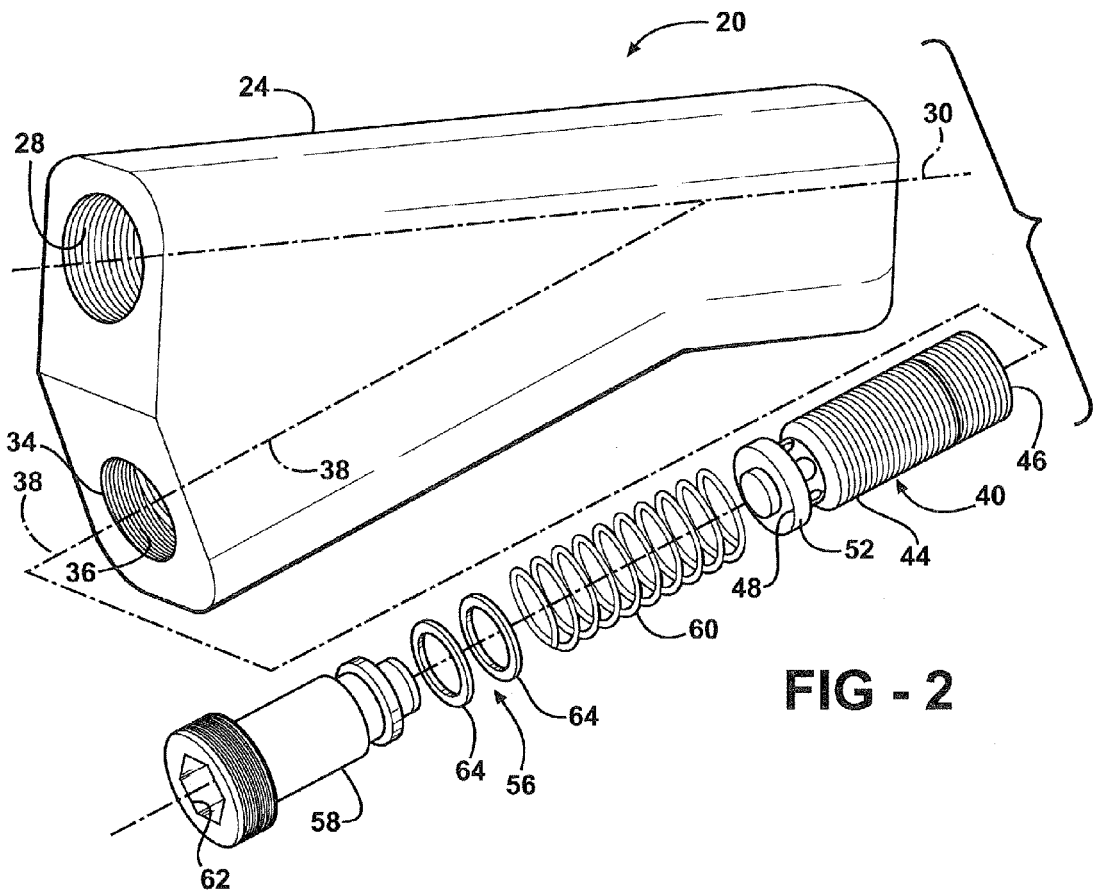
FIG. 2 is an exploded perspective view of a fluid flow control valve.
Figure 3:
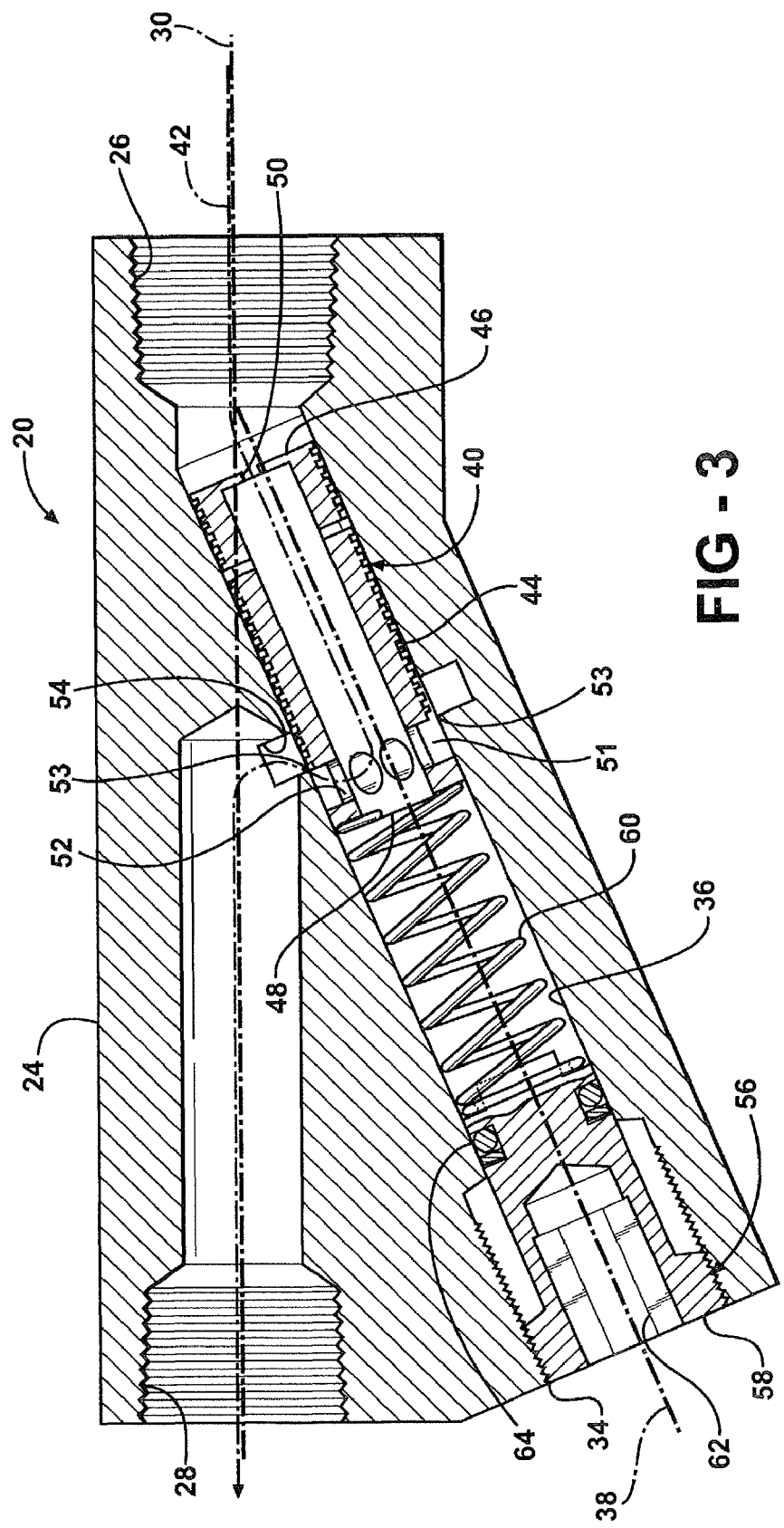
FIG. 3 is a longitudinal cross sectional view of the fluid flow control valve.

Referring to FIGS. 2 and 3, the control valve 20 comprises a housing 24. Preferably, the housing 24 is manufactured from aluminum. However, it should be appreciated that the housing 24 may be manufactured from some other material capable of conducting the fluid therethrough under pressure. The material utilized for the housing 24 must also be chemically resistant to the specific fluid flowing therethrough.

The housing 24 defines an inlet chamber 26 and an outlet chamber 28. The outlet chamber 28 is disposed along a outlet axis 30. The outlet chamber 28 is spaced from the inlet chamber 26. Preferably, the inlet chamber 26 is disposed along the outlet axis 30 in-line with the outlet chamber 28. However, it should be appreciated that the inlet chamber 26 may be offset, i.e., not aligned with the outlet chamber 28 nor aligned along the outlet axis 30.

The inlet chamber 26 and the outlet chamber 28 are configured to accept a connecting pipe fitting. Preferably, the inlet chamber 26 and the outlet chamber 28 are configured to include a cross section having a circular shape defining a diameter. The diameter may include a one half inch (½") diameter or a one inch (1") diameter. It should be appreciated that the size of the inlet chamber 26 and the outlet chamber 28 may vary from the one half inch (½") and the one inch (1") diameter described above. Preferably, the inlet chamber 26 and the outlet chamber 28 are configured to accept a one half inch (½") NPT fitting or a one inch (1") NPT fitting. It should be appreciated that the connection type of the inlet chamber 26 and the outlet chamber 28 may vary from the NPT threads described above and may include, among others, SAE, JIC, ISO-G, flange style and compression fittings as well as manifold options. Accordingly, and as shown in FIG. 1, it should be appreciated that the control valve 20 is part of a pipe or manifold system, in which the fluid flows through, with pipe fittings attached to the inlet chamber 26 to provide the fluid to the control valve 20 and other pipe fittings attached to the outlet chamber 28 to receive the fluid from the control valve 20 at the pre-determined flow rate.

The housing 24 further defines an opening 34. A bore 36 extends from the opening 34 into the housing 24, and generally into the inlet chamber 26. The bore 36 extends along a plane 38, which intersects the outlet axis 30, i.e., the plane 38 is angled relative to the outlet axis 30. It should be appreciated that the bore 36 extends along an axis that is defined by and coplanar with the plane 38. For clarity, plane 38 is shown in the drawings as a line. However, it is to be appreciated that the plane 38 is two-dimensional, and as such, extends into and out of the drawings. Therefore, it should be appreciated that while the axis along which the bore 36 extends may not intersect the outlet axis 30, the plane 38 along which the bore extends does intersect the outlet axis 30, i.e., the bore 36 may be laterally offset from the outlet axis 30 while the plane 38 along which the bore 36 extends still intersects the outlet axis 30. Accordingly, the plane 38 and the outlet axis 30 define an angle therebetween, with the opening 34 of the housing 24 laterally offset from outlet axis 30.

As shown, the plane 38 and the outlet axis 30 intersect within the housing 24. However, it should be appreciated that the plane 38 and the outlet axis 30 may intersect at a point located outside of the housing 24. Preferably, the plane 38 and the outlet axis 30 define an acute angle therebetween. However, it should be appreciated that the plane 38 and the outlet axis 30 may also intersect at a perpendicular angle therebetween.

A flow control device 40 is disposed within the bore 36. The flow control device 40 defines a fluid passage 42. The fluid passage 42 interconnects the inlet chamber 26 and the outlet chamber 28. The flow control device 40 controls the fluid flow rate of the fluid between the inlet chamber 26 and the outlet chamber 28.

Figure 4:
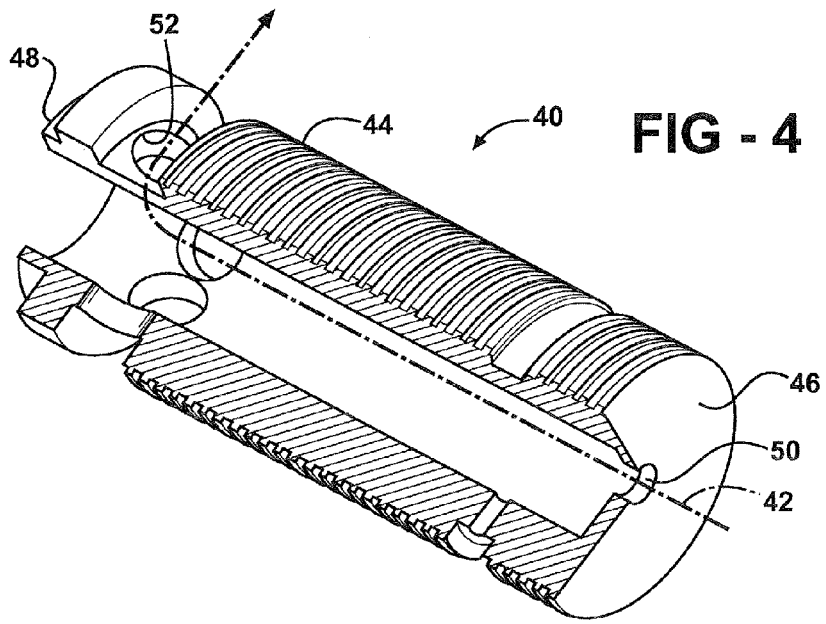
FIG. 4 is a partial cut-away perspective view of a flow control device of the fluid flow control valve.

Referring also to FIG. 4, the flow control device 40 includes a piston 44. The piston 44 is moveable within the bore 36 along the plane 38. The piston 44 includes a first end 46 and a second end 48. The first end 46 is disposed adjacent the inlet chamber 26 and defines at least one aperture 50, but may define a plurality of apertures 50. The second end 48 is disposed opposite the first end 46 along the plane 38 and defines at least one orifice 52. As shown, the second end 48 defines a plurality of orifices 52 and an annular flow path 51. The inlet chamber 26 is in fluid communication with the aperture 50, the aperture 50 is in fluid communication with the at least one orifice 52, the at least one orifice 52 is in fluid communication with the annular flow path 51, and the annular flow path 51 is in fluid communication with outlet chamber 28. Accordingly, the fluid flows from the inlet chamber 26, through the aperture 50, the orifice 52 and the annular flow path 51 of the piston 44, into the outlet chamber 28.

The aperture 50 includes a pre-determined cross sectional area for regulating the fluid flow rate of the fluid. Preferably, the aperture 50 includes a circular cross section having a pre-determined diameter. However, it should be appreciated that the cross sectional shape of the aperture 50 may vary, and that it is the cross sectional area and the depth and contour of the leading and lagging edges that determines the fluid flow rate through the piston 44. It should be appreciated that the piston 44 could also be comprised of two (2) or more separate components, the common piston body and an orifice module with the various apertures 50, assembled together into one assembly.

Referring to FIG. 3, the outlet chamber 28 includes at least one entrance port 54, but may define a plurality of entrance ports 54. The entrance port 54 is in fluid communication with the annular flow path 51 and the annular flow path 51 is in fluid communication with the at least one orifice 52. The interface between the annular flow path 51 relative to the entrance port 54 defines a variable valve orifice 53. The variable valve orifice 53 created by the position of the annular flow path 51 relative to the entrance port 54 in the control valve 20 may be defined by a complete an uninterrupted ring whereas other devices typically utilize at least one partially blocked orifice usually placed radially around the circumference. Utilizing the complete ring shaped variable orifice 53 maximizes the flow area for a given stroke, decreases the travel required to adjust the variable valve orifice 53 and therefore increases the sensitively of the control valve 20. The annular flow path 51 and the entrance port 54 extend transverse to the plane 38 and the outlet axis 30 to intersect the outlet chamber 28. Accordingly, the fluid flows from the orifice 52, through the annular flow path 51, through the variable valve orifice 53, through the entrance port 54 and into the outlet chamber 28.

An adjustment mechanism 56 is coupled to the flow control device 40. The adjustment mechanism 56 adjusts the force against the piston 44 and proportionally the pressure drop across the aperture 50 to adjust the fluid flow rate between the at least one orifice 52 and the entrance port 54 of the outlet chamber 28. As such, the aperture 50 of the piston 44 defines the fluid flow rate through the piston 44, and the adjustment mechanism 56 adjusts or alters the fluid flow rate to fine tune or customize the flow of the fluid into the outlet chamber 28.

The adjustment mechanism 56 includes a head 58 in threaded engagement with the bore 36, and a spring 60 disposed along the plane 38 between the head 58 and the piston 44. The spring 60 is disposed within the bore 36, and abuts the piston 44. The head 58 includes a tool engaging recess 62 adjacent the opening 34. The tool engaging recess 62 provides an interface between the head 58 and a tool (not shown) to allow a user to rotate the head 58 about the plane 38. It should be appreciated that the head 58 will move along the plane 38 in response to threaded rotation about the plane 38. Preferably, the tool engaging recess 62 includes a hexagonal shape for engagement with an allen wrench. However, it should be appreciated that the tool engaging recess 62 may be configured differently than shown and described herein for engagement with some other tool.

The spring 60 is disposed between the head 58 and the piston 44 to urge the piston 44 along the plane 38. In operation, the spring 60 is compressed between the head 58 and the piston 44 in response to the fluid pressure exerted by the fluid onto the piston 44. Accordingly, it should be appreciated that at a given fluid pressure, the spring 60 is compressed a certain distance along the plane 38. The distance the spring 60 is compressed is dependent upon the spring constant of the spring 60. Therefore, varying the spring 60 constant of the spring 60 will alter the flow rate through the control valve 20.

Advancement or retraction of the head 58 within the bore 36 compresses the spring 60 along the plane 38 and thereby adjusts the force against the piston 44 along the plane 38. Accordingly, adjustment of the spring 60 adjusts the force against the piston 44 and therefore across the aperture 50 and the variable valve orifice 53 thus creating a controlled pressure drop across aperture 50. Moving, i.e., realigning, the annular flow path 51 relative to the entrance port 54 alters the cross sectional area of the variable valve orifice 53 between the annular flow path 51 and the entrance port 54 through which fluid may flow. Altering the cross sectional area between the annular flow path 51 and the entrance port 54 thereby adjusts the pressure drop of the fluid across the variable valve orifice 53. As the fluid flow rate tries to increase, the pressure drop across the aperture 50 increases, thus creating a force against the piston 44. The increased force compresses the spring 60 and closes off the variable valve orifice 53 by minute movement of the piston 44, thus creating additional restriction and maintaining a constant flow rate.

The head 58 includes at least one seal 64 for sealing the bore 36. As shown, the seal 64 is disposed circumferentially about the head 58 in sealing engagement with the bore 36. Accordingly, the seal 64 prevents the fluid from leaking through the bore 36. It should be appreciated that the at least one seal 64 may include multiple seals 64 and or backup supports as shown. Preferably, the at least one seal 64 includes an annular o-ring gasket. However, it should be appreciated that the seal 64 may include some other type of seal 64 not shown or described herein, and may be located in some other place within the bore 36 to seal 64 the bore 36.

The flow control device 40 and the adjustment mechanism 56 are disposed within the bore 36, with the adjustment mechanism 56 operable through the opening 34 of the bore 36. As described above, the opening 34 is laterally offset from the outlet axis 30. Accordingly, the flow control device 40 and the adjustment mechanism 56 are removable from within the bore 36 of the housing 24 through the opening 34. Because the flow control device 40 and the adjustment mechanism 56 are removable through the bore 36, the control valve 20 need not be removed, nor loosened, from any connecting pipe fittings connected to the inlet chamber 26 and the outlet chamber 28.

Preferably, the piston 44 includes a plurality of interchangeable pistons 44. Each of the apertures 50 of each of the plurality of interchangeable pistons 44 includes a different pre-determined cross sectional area. Accordingly, because the flow rate of the fluid is dependent upon the cross sectional area of the aperture 50 as described above, the plurality of different pistons 44 provides a plurality of different fluid flow rates. Once again, because the flow control device 40 and the adjustment mechanism 56 are easily removable through the opening 34 of the bore 36, the plurality of different pistons 44 are easily interchangeable without having to remove any connecting pipe fittings connected to the inlet chamber 26 and the outlet chamber 28.

Figure 5:
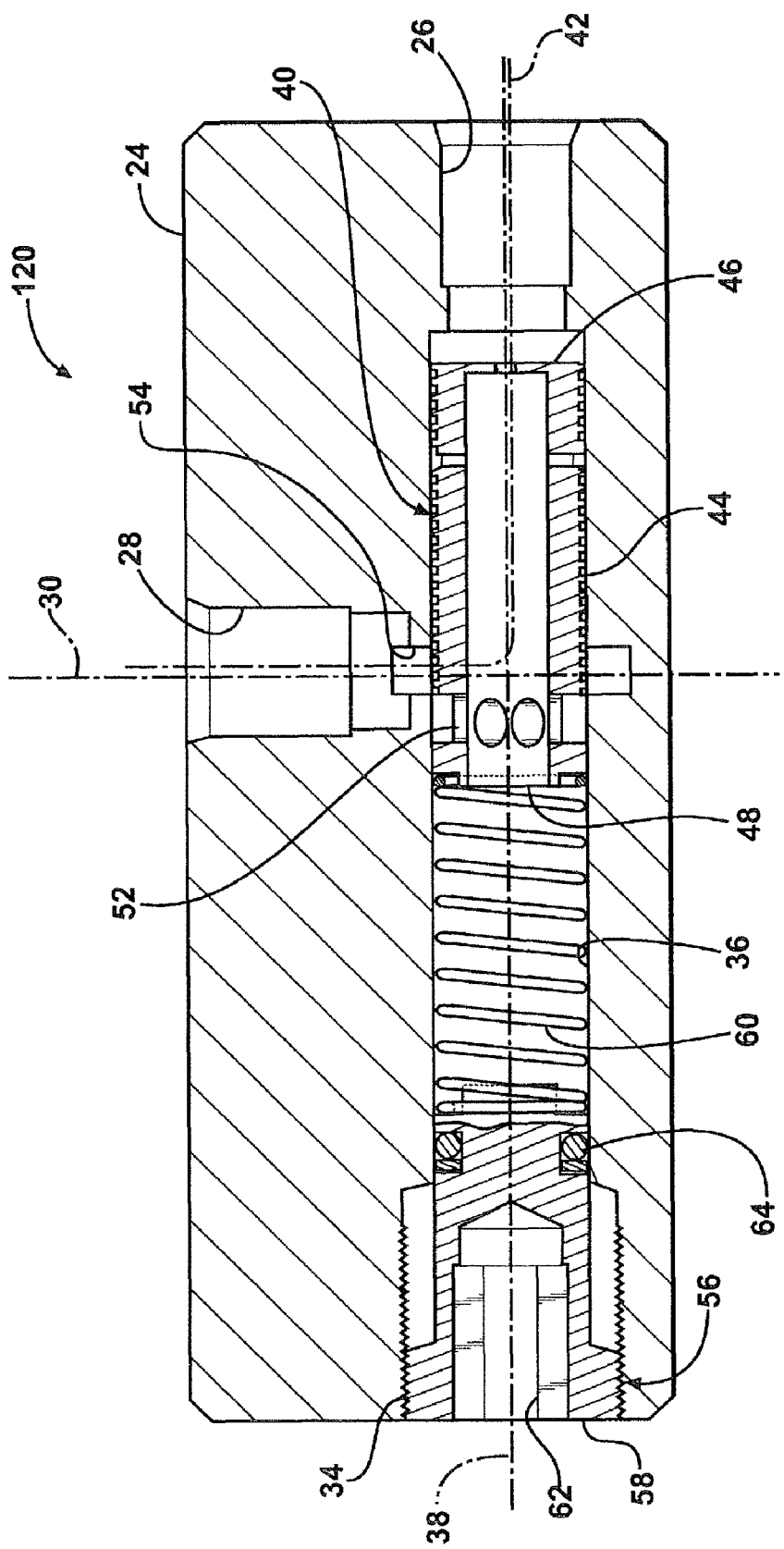
FIG. 5 is a longitudinal cross sectional view of an alternative embodiment of the fluid flow control valve.

Referring to FIG. 5, an alternative embodiment of the flow control valve is shown generally at 120. The alternative embodiment of the flow control valve 120 shows the outlet axis 30 disposed at a perpendicular angle relative to the plane 38. It should be appreciated that the operation of the alternative embodiment of the flow control valve 120 is identical to the preferred embodiment described above.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fluid flow control valve comprising:
    a housing defining an inlet chamber and an outlet chamber spaced from said inlet chamber with said outlet chamber disposed along an outlet axis;
    a flow control device defining a fluid passage interconnecting said inlet chamber and said outlet chamber for controlling a fluid flow rate of a fluid between said inlet chamber and said outlet chamber; and
    an adjustment mechanism coupled to said flow control device to adjust the fluid flow rate;
    said housing further defining an opening and a bore extending from said opening along a plane intersecting said outlet axis with said flow control device and said adjustment mechanism disposed within said bore and said adjustment mechanism operable through said opening, said bore including a threaded portion and a smooth portion;
    said adjustment mechanism including a head disposed in said bore, said head being removable from said bore through said opening for removing said flow control device from said bore through said opening; and said head including threads directly threadedly engaging said threaded portion of said bore and a seal directly sealing against said smooth portion of said bore and being longitudinally fixed relative to said threads such that said seal moves with said head along said bore during threaded movement of said head relative to said bore.

2. A valve as set forth in claim 1 wherein said opening is laterally offset from said outlet axis and laterally spaced from said inlet chamber and said outlet chamber.

3. A valve as set forth in claim 1 wherein said plane and said outlet axis are perpendicular.

4. A valve as set forth in claim 1 wherein said head includes a tool engaging recess adjacent said opening.

5. A valve as set forth in claim 1 wherein said inlet and said outlet include a cross section having a circular shape defining a one half inch (½") NPT fitting.

6. A valve as set forth in claim 1 wherein said inlet and said outlet include a cross section having a circular shape defining one inch (1") NPT fitting.

7. A valve as set forth in claim 1 wherein said smooth portion of said bore has a diameter less than a diameter of said threaded portion of said bore.

8. A valve as set forth in claim 1 wherein said plane and said outlet axis define an acute angle therebetween.

9. A valve as set forth in claim 8 wherein said inlet chamber is disposed along said outlet axis.

10. A valve as set forth in claim 1 wherein said flow control device includes a piston moveable within said bore along said plane and having a first end defining an aperture and a second end defining at least one orifice in fluid communication with said aperture.

11. A valve as set forth in claim 10 wherein said aperture is in fluid communication with said inlet chamber and said at least one orifice is in fluid communication with said outlet chamber and wherein the fluid flows from said inlet chamber through said aperture and said at least one orifice of said piston into said outlet chamber.

12. A valve as set forth in claim 10 wherein said aperture includes a pre-determined cross sectional area for regulating the fluid flow rate of the fluid.

13. A valve as set forth in claim 12 wherein said piston includes a plurality of interchangeable pistons with each of said apertures of each of said plurality of interchangeable pistons having a different pre-determined cross sectional area to provide a plurality of different fluid flow rates.

14. A valve as set forth in claim 10 wherein said outlet chamber includes an entrance port in fluid communication with said at least one orifice.

15. A valve as set forth in claim 14 wherein said at least one orifice and said entrance port extend transverse to said plane to intersect said outlet chamber.

16. A valve as set forth in claim 15 wherein said fluid passage extends parallel to said plane.

17. A valve as set forth in claim 14 wherein said adjustment mechanism includes a spring disposed within said bore and abutting said piston to compress said piston along said plane for adjusting the fluid flow rate of the fluid between said at least one orifice and said entrance port.

18. A valve as set forth in claim 17 wherein said head varies compression of said spring in response to threaded movement of said head relative to said bore.

19. A valve as set forth in claim 17 wherein said spring is disposed along said plane between said head and said piston.

20. A fluid flow control valve comprising:

a housing defining an inlet chamber disposed along an axis and an outlet chamber spaced from said inlet chamber;

a flow control device defining a fluid passage interconnecting said inlet chamber and said outlet chamber for controlling a fluid flow rate of a fluid between said inlet chamber and said outlet chamber; and an adjustment mechanism coupled to said flow control device to adjust the fluid flow rate;

said housing further defining an opening and a bore extending from said opening with said flow control device and said adjustment mechanism disposed within said bore and said adjustment mechanism operable through said opening, said bore including a threaded portion and a smooth portion;

said adjustment mechanism including a head disposed in said bore and being removable from said bore through said opening for removing said flow control device from said bore through said opening; and said head including threads directly threadedly engaging said threaded portion of said bore and a seal directly sealing against said smooth portion of said bore and being longitudinally fixed relative to said threads such that said seal moves with said head along said bore during threaded movement of said head relative to said bore.

21. A valve as set forth in claim 20 wherein said smooth portion of said bore has a diameter less than a diameter of said threaded portion of said bore.

22. A valve as set forth in claim 20 wherein said bore extends from said opening along a plane and wherein said flow control device includes a piston moveable within said bore along said plane and having a first end defining an aperture and a second end defining at least one orifice in fluid communication with said aperture.

23. A valve as set forth in claim 22 wherein said aperture is in fluid communication with said inlet chamber and said at least one orifice is in fluid communication with said outlet chamber and wherein the fluid flows from said inlet chamber through said aperture and said at least one orifice of said piston into said outlet chamber.

24. A valve as set forth in claim 22 wherein said outlet chamber is disposed along said axis in-line with said inlet chamber.

25. A valve as set forth in claim 22 wherein said aperture includes a pre-determined cross sectional area for regulating the fluid flow rate of the fluid.

26. A valve as set forth in claim 25 wherein said piston includes a plurality of interchangeable pistons with each of said apertures of each of said plurality of interchangeable pistons having a different pre-determined cross sectional area to provide a plurality of different fluid flow rates.

27. A valve as set forth in claim 22 wherein said outlet chamber includes an entrance port in fluid communication with said at least one orifice.

28. A valve as set forth in claim 27 wherein said adjustment mechanism includes a spring disposed within said bore and abutting said piston to compress said piston along said plane for adjusting the fluid flow rate of the fluid between said at least one orifice and said entrance port.

29. A valve as set forth in claim 28 wherein wherein said head varies compression of said spring in response to threaded movement of said head relative to said bore.

30. A valve as set forth in claim 28 wherein said spring is disposed along said plane between said head and said piston.

* * * * *